March 21, 1967     W. RODENACKER     3,309,736
WORM PRESS
Filed May 6, 1965
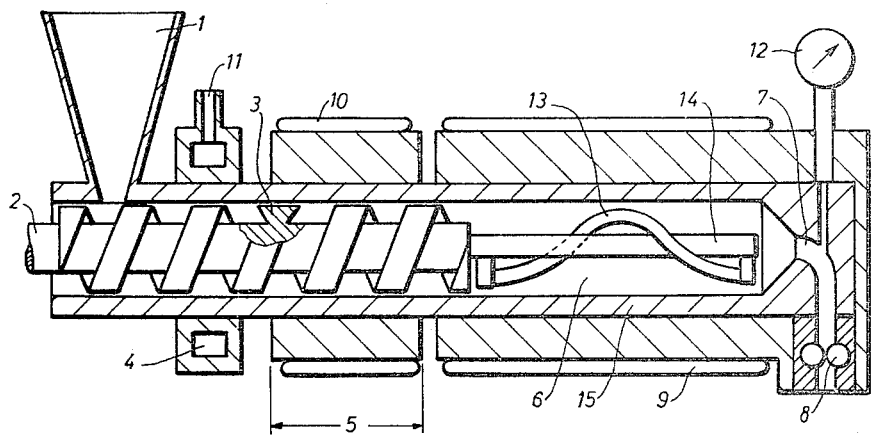
INVENTOR.
WOLF RODENACKER
BY *Burgess, Dinklage & Sprung*
ATTORNEY

United States Patent Office 3,309,736
Patented Mar. 21, 1967

3,309,736
WORM PRESS
Wolf Rodenacker, Dormagen, Germany, assignor to Farbenfabriken Bayer Aktiengesellschaft, Leverkusen, Germany, a corporation of Germany
Filed May 6, 1965, Ser. No. 453,657
Claims priority, application Germany, May 13, 1964,
F 42,867
5 Claims. (Cl. 18—12)

This invention relates to a worm press for melting shavings of thermoplastic synthetic resin, in which the housing of the worm is provided with a tempering zone heated to a lower temperature than that of the melting zone and arranged in front of the melting zone in the conveying direction, the threads of the worm ending at the exit of the tempering zone, in the conveying direction.

Known worm presses of this kind are connected to gear pumps for the production of formed structures such as wires and fibres, these gear pumps being arranged behind the worm press, viewed in the conveying direction, and delivering into an outlet die.

In this arrangement, the rate at which the solid shavings are supplied had to be adjusted to the rate at which the melt is removed from the gear wheel pump because if the rate of supply of shavings is too high, the solid-liquid phase boundary in the machine moves into the cold part of the press which is situated in front of the tempering zone viewed in the direction of flow, which may lead to solidification of the melt and to buckling of the housing and breakage of the worm whereas if the rate of supply is too low, the machine would run idle.

It has therefore already been proposed to use the torque which is exerted on the shaft or on the housing of the worm by the solidifying melt as governing factor for dosing the quantity of the melt. This requires a dosing device in the form of a dosing channel or a bucket wheel. Such an arrangement often gives rise to disadvantages. If a dosing channel is used, the supply of shavings, which often has to be carried out under a protective atmosphere, entails considerable expense because the dosing channel then has to be accommodated in a gas-tight container.

It has now been found that this method of control can be dispensed with completely and hence one can dispense with the dosing device, without the risk of solidification of the melt if the worm is provided, in accordance with the invention, with undercut webs or spirals.

Since with rising level of the melt an increasing resistance is produced at the phase boundary due to cooling of the melt, it is necessary to use a worm in which the rate of supply of shavings is in this case reduced. This effect is achieved by undercutting the webs or turns of the worm in the part of the press between the feed hopper and the tempering zone.

Reduction in the rate of delivery is brought about because the pressure between the shavings is largely taken up by the undercut threads of the worm themselves. Where these undercut worm threads are provided, the shavings are pressed to a much less extent against the wall of the worm housing than in the case of the trapezoidal or rectangular screw threads. Consequently when the resistance in the phase boundary increases, the quantity of shavings is less than that in worms equipped with rectangular or trapezoidal threads. If the quantity of melt removed by the gear wheel pump is greater than the quantity of shavings supplied then the solid-liquid phase boundary shifts in the direction of the melt zone. The resistance to delivery of the shavings is reduced. Since the feed hopper of the worm press is always kept filled, the worm is then again in a position to supply more shavings in the direction of the phase boundary until the opposing forces at the phase boundary have become greater. The rate of delivery, which depends on the pressure with which the shavings are pressed against the wall of the housing, then diminishes owing to the undercutting of threads of the worm. There is thus established an automatic adjustment between the quantity of shavings supplied to the worm and the quantity removed by the pump and no special control device is then required.

The drawing shows a worm extruder in accordance with the above description for melting synthetic resins. It operates as follows:

A feed hopper 1 is completely filled with shavings. The extent of filling is maintained by a special container (not shown). The shavings are taken up by the trapezoidal threads 3 of the worm 2 and conveyed towards the melt zone 6. They pass through a cooling zone 4 and a phase boundary or tempering zone 5 before reaching the part 6 of the machine where they are stirred into the melt proper and melted. The melt flows through a pipe line 7 into a gear wheel pump 8 which delivers it, for example, through a die (not shown).

The various temperatures are controlled by a heating element 9 in the zone 6, a special heating element 10 in the zone 5 and by a coolant introduced through connecting pipes 11 in the cooling zone. The melting process then takes place as follows:

A certain quantity of shavings is first delivered into the machine and then, with the machine at a standstill, the shavings are melted in the part 6; more shavings are then delivered which liquefy in the melt. While the screw is in rotation, the melt has a tendency to flow in the opposite direction to the solid shavings inside the machine if the quantity delivered by the pump 8 is smaller than the quantity supplied by the worm. In this case, the melt enters as far as the phase boundary zone 5 against the direction of conveyance of the shavings and forms there a plug of liquid-solid material which moves forwards in jerks if the temperature in this zone is too low but which moves forwards smoothly if the temperature has been correctly chosen and adjusted. If the temperature in the zone 5 is too high, the plug of liquid-solid material moves beyond the zone 5 towards the feed hopper. These operating conditions can be read off the manometer 12. The shavings entering from the hopper 1 are now pressed by the worm against the plug of material slowly moving towards the hopper. As the counter pressure from the plug increases, the delivery of shavings greatly diminishes; only as much fresh shavings are supplied at any given time as corresponds to the forward movement of the plug towards the outlet end of the worm. For stirring the shavings into the melt in part 6, a rod 13 bent into a spiral has been chosen which is arranged on the screw shaft 14 and ensures efficient heat exchange with the wall 15.

It is also possible to extend the length of the screw shaft 14 and use it as drive shaft for a gear wheel pump (not shown). This provides a particularly simple one-shaft arrangement.

As can readily be appreciated from the drawing, the laterally undercut worm thread 3 defines a shaving conveying region between consecutive thread flights which is wider along the root than along the outer periphery of the worm 2. The advantage in providing such undercut worm thread 3, which is preferably undercut along both sides as shown, lies in the fact that a portion of the outward radial component of the shaving compaction pressure forces existing in the conveying region will act against the laterally undercut portions of the worm thread 3, thereby reducing the portion of such radially outward pressure forces acting against the housing.

If the worm thread 3 were to be made with a rectangular axial cross section and without any undercut, whereby the housing wall 15 would be exposed to radially outward pressure forces acting along a spiral band area of width equal to the uniform spacing between thread flights, there would be no part of the thread 3 available to take up any radially outward pressure forces. With the undercut thread construction according to the invention, the laterally undercut portions of the thread 3 reduce the area of the housing wall 15 exposed to such outward pressure forces by an amount equivalent to their radially projected areas upon the wall 15.

Approaching the concept of the invention in another way, the outer peripheral surface of the worm thread 3 wipes against the surface of the housing wall 15 as the worm 2 is rotated. Between the thread 3 flights, there exists a spiral passage which is exposed at one end to the melting zone 6, and in which the shavings are conveyed thereto. If, for any reason during the operation of the worm press, the resistance to entry of shavings into the melting zone 6 is increased, the compaction pressure of the shavings in such spiral conveying passage will also increase. Accordingly, such increased internal pressure will exert radially outward forces on the wall 15, which, if high enough, will cause strain damage thereto. From elementary fluid mechanics, it is well known that for a given pressure, the force resulting therefrom is proportional to the area exposed to fluid pressure, and the force component in any given direction is proportional to the projection of such area normal to the direction.

Consequently, with the undercut thread 3 construction of the invention, for a given conveying volume, the peripheral surface area of the thread 3, which wipes against the wall 15 is greater, and thus shields a greater portion of the wall 15 surface from the action of pressure forces, than in the case of non-undercut trapezoidal threads, or rectangular threads.

Of course, from the geometry shown in the drawing, the increased wall 15 wiping area of the thread 3 directly corresponds to that of the radially outward projected area of the overhanging undercut sides of said thread 3, which side portions receive the pressure force relieved from the wall 15. However, as can be appreciated by the artisan, the thread 3, even with undercutting on both sides, is inherently more capable of withstanding pressure forces along its overhanging sides than would be a housing cylinder of equivalent material thickness but with an internal diameter equal to the thread 3 peripheral diameter.

I claim:
1. A worm press for melting thermoplastic synthetic resins supplied in the form of shavings, which comprises a housing having an inlet disposed to receive thermoplastic resin shavings, an intermediate axial zone communicating at one end with said inlet, a heatable axial zone for melting such shavings and communicating with the other end of said intermediate zone, and an outlet communicating with said melting zone for discharging molten thermoplastic material therefrom; and a worm member disposed for rotation within said housing to convey shavings received at the inlet thereof through said intermediate zone and into said melting zone for melting therein, said worm member having a thread extending in axial length from said housing inlet through said intermediate zone and to said melting zone, said worm thread being laterally undercut at and along the root portion thereof to define a shaving conveying region between consecutive thread flights which is wider along the root than along the outer periphery of the worm member, whereby a portion of the outward radial component of shaving compaction pressure forces existing in said region acts against the laterally undercut portions of the thread thereby reducing the portion of such radially outward pressure forces acting against the housing.

2. The worm press according to claim 1 wherein said worm thread is laterally undercut at and along the root portion on both sides.

3. The worm press according to claim 2 wherein said worm thread is laterally undercut to define a shaving conveying region between consecutive thread flights having a trapezoidal-shaped axial cross section.

4. The worm press according to claim 2 including heating means disposed in contact with said housing to externally heat a portion of the intermediate axial zone thereof.

5. The worm press according to claim 4 including cooling means disposed in contact with said housing to externally cool a portion of the intermediate axial zone thereof.

References Cited by the Examiner

UNITED STATES PATENTS

| | | | |
|---|---|---|---|
| 478,481 | 7/1892 | Thompson | 25—14 |
| 1,375,623 | 4/1921 | Bartels | 18—12 |
| 1,595,470 | 8/1926 | Johnson | 18—12 X |
| 1,762,368 | 6/1930 | Vandergrift | 18—12 |
| 2,653,915 | 9/1953 | Elgin et al. | 18—12 X |
| 2,734,226 | 2/1956 | Willert | 18—12 X |
| 2,770,837 | 11/1956 | Reifenhauser | 18—12 |
| 2,785,438 | 3/1957 | Willert | 18—12 |
| 2,893,055 | 7/1959 | Wenzel | 18—12 |
| 3,145,420 | 8/1964 | Joukaninen et al. | 18—12 |
| 3,187,382 | 6/1965 | Lowe | 18—12 |

FOREIGN PATENTS 505,494   12/1954   Italy.

WILLIAM J. STEPHENSON, *Primary Examiner.*